Figure 1:
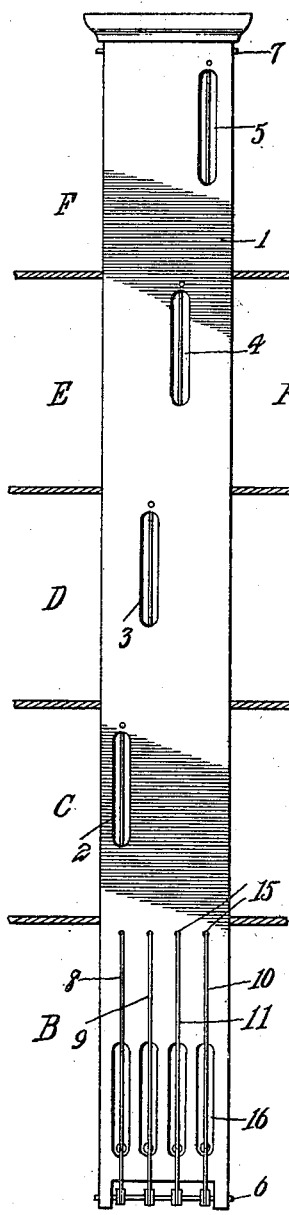

T. ROYSTON.
THERMOMETER SUPPORT.
APPLICATION FILED AUG. 9, 1916.

1,230,035.

Patented June 12, 1917.

WITNESSES

INVENTOR
Thomas Royston.

BY

ATTORNEY

UNITED STATES PATENT OFFICE.

THOMAS ROYSTON, OF MADISON, WISCONSIN.

THERMOMETER-SUPPORT.

1,230,035.  Specification of Letters Patent.  Patented June 12, 1917.

Application filed August 9, 1916. Serial No. 113,978.

*To all whom it may concern:*

Be it known that I, THOMAS ROYSTON, a citizen of the United States, residing at Madison, in the county of Dane and State of Wisconsin, have invented certain new and useful Improvements in Thermometer-Supports, of which the following is a specification.

This invention relates to an improvement in supporting means for thermometers and has for its principal object the provision of means by which a thermometer can be moved to and supported upon various floors of a building having more than one story, to thus allow indicating readings of the temperature upon the various floors to be taken from a single floor.

A further object lies in so constructing the parts that the entire operation of the device in bringing the thermometers to the point at which the temperature is to be taken and returning same to obtain the reading of the same can be accomplished without entrance upon the particular floor or into the room where the temperature is to be determined, mechanism being provided to permit the movement of the thermometer from and the return to the starting point.

Yet another object is to provide supporting means which is so arranged that a plurality of thermometers may be mounted in conjunction therewith and may be brought to the proper registering relation upon various floors to thus permit indicating readings to be taken simultaneously as to the temperature upon various floors.

With the above and other objects in view, my invention consists in certain novel features of construction and combinations of parts which will be hereinafter set forth in connection with the drawings and then more particularly pointed out in the claims.

In the drawings:—

Figure 2:
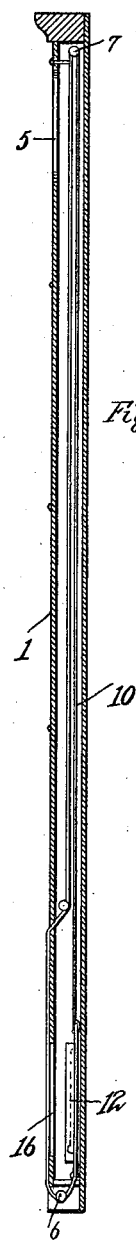
Figure 3:
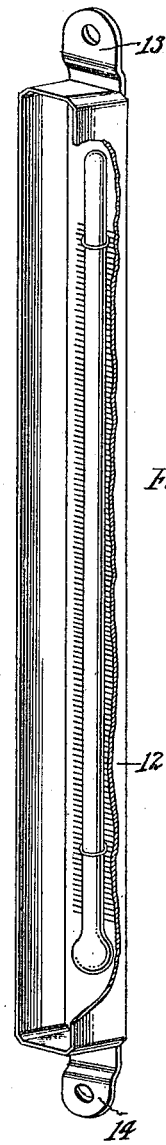

Figure 1 is a diagrammatic view showing the arrangement of the supporting structure and the manner in which the same extends through several stories of the building, Fig. 2 is a transverse vertical sectional view through the disclosure in Fig. 1, and Fig. 3 is a perspective view of one of the indicating thermometers with portions of case structure thereof broken away to more clearly illustrate the device.

In flat buildings, apartment houses, school houses, warehouses, and in fact in any building which extends over several floors and is heated, it is particularly difficult to maintain any sort of a standard temperature as to determine the temperature in each individual room of every floor, it is necessary that a thermometer be placed therein to remain for a sufficient length of time to adjust itself to the temperature condition, and where an endeavor is made to place a thermometer in each individual room, or even upon each floor, it has been necessary to have access to the rooms or floors to obtain readings of the indications of the thermometer, and it is a purpose of my invention to provide a device with which thermometers may be moved to occupy positions within particular rooms or compartments or upon particular floors and may be then again brought to a central point, preferably near the heating plant, to thus allow reading and determination of the temperature in various locations within the building so that adjustment and regulation may be made at the heating plant to accomplish the proper and most efficient heating action.

With the foregoing in mind, the device constitutes a tubular casing 1, which is extended from the basement or other point where the heating plant is located, up through the several floors so that a portion of this casing is exposed in each story of the building, it being preferable that the casing be located at a point where the average temperature for the floor, room, or compartment will be had. This casing has openings provided through the front wall thereof, and in the present disclosure in which the casing 1 is shown extended upwardly from the basement at B through the four stories of the building as indicated at C, D, E, and F, these openings are indicated at 2, 3, 4 and 5. By providing the openings 2, 3, 4 and 5 through the front side of the casing 1, communication is established to the various floors and thermometers placed within the openings will be exposed to the air as contained upon the various floors of the building thus permitting the temperature of the air to be determined.

Spindles 6 and 7 are mounted transversely across the casing 1 at the top and bottom thereof and belts or cables 8, 9, 10, and 11 are mounted over these spindles in such relations that they are disposed in line with the openings 2, 3, 4 and 5. Thermometers 12, which may be of the usual type have the ears or tabs 13 and 14 provided at the ends of the casing and the cables 8, 9, 10 and 11 are connected through openings provided in these ears 13 and 14, so that the thermometers are connected in the cables and the cables are made substantially continuous and endless in their looping around the spindles 6 and 7.

It is preferable that the cables being extended through openings 15 provided in the forward side of casing 1 near the bottom to thus permit access to be had readily to these cables so that they can be manually moved in either direction to raise or lower the thermometers within the casings, and openings 16 are provided through the forward side of the casing at the bottom to permit the operator to view the thermometers after they have been returned from the registering position.

In the installation of the device, the casing will be constructed to extend up through the various stories of the building with the lower end located at the point where the readings of the thermometers are to be made and this casing may be finished to match the wall finish or the woodwork of the rooms or floors through which it passes, and the openings in the casing will be positioned as above set forth. When it is desired to determine the temperature upon any particular floor through which the casing passes, the cable passing before the opening communicating with that particular floor is drawn downwardly and the thermometer connected in the cable is thus raised to the proper position, it being preferable that indicating gage markings be made on the cables so that it can be determined when the thermometer has been brought to the proper registry with the predetermined opening. The thermometer will be permitted to remain in this position until it has had an opportunity to be affected by the temperature condition through the passage of the air therearound through the opening, and then the cable carrying the thermometer is again manipulated to bring the thermometer down to a position where it can be read through the registering opening 16 and thus indicating readings may be made for the various floors either singly or simultaneously when a number of thermometers are used.

Under some circumstances it might be found desirable to employ a single thermometer and to provide the openings of the casing in alinement for the various floors thus permitting use of the single thermometer for each of the several floors, and also it will be apparent that various other changes and modifications might be resorted to in the form and arrangement of the parts of the structure without departing from the spirit and scope of my invention, and hence I do not wish to be limited to the exact disclosure, but only to such points as may be set forth in the claims.

I claim:—

1. In combination with a casing extending through a plurality of compartments or throughout several stories of a building and having openings throughout the length thereof to communicate with the various compartments, spindles mounted at the ends of the casing, a thermometer, and an endless cable in which the thermometer is connected extended around the spindles to thus be moved to and held adjacent any one of the openings.

2. In combination with a casing extended through a plurality of stories of a building provided with openings above each of the floors, spindles mounted adjacent the upper and lower ends of said casing, thermometers mounted within the casing and endless cables mounted over said spindles and having the thermometers connected therein so that as the cables are moved the thermometers will be carried adjacent the openings, said casing having openings provided therein to permit access to be had to the cables for manually moving the thermometers.

3. In combination with a casing arranged to extend up through a plurality of stories of a building and provided with openings formed throughout its length in offset relation to establish communication from the casing to each of the various floors, thermometers arranged within the casing for each of the various off-set openings, said casing provided with a plurality of viewing openings arranged at a common point, spindles mounted adjacent to the upper and lower end of said casing, and cables mounted over said spindles having the thermometers connected therein in such relation that by manipulation of the cables the thermometers may be moved from the viewing openings to the corresponding off-set openings to be affected by the atmospheric temperature of the air upon the floor with which the pre-determined opening communicates and may be then again returned to the viewing opening to have the temperature indication read.

In testimony whereof I affix my signature in presence of two witnesses.

THOMAS ROYSTON.

Witnesses:
F. L. GILBERT,
R. H. PROCTOR.